United States Patent [19]

Cekoric, Jr. et al.

[15] 3,671,399
[45] June 20, 1972

[54] POLYANIONIC COMPOUNDS IN CULTURE MEDIA

[72] Inventors: Thomas Cekoric, Jr., Belleville; George Evans, Hopatcong; Ronald Searcy, Upper Montclair, all of N.J.

[73] Assignee: Hoffman-La Roche & Inc., Nutley, N.J.

[22] Filed: Aug. 30, 1968

[21] Appl. No.: 756,427

Related U.S. Application Data

[63] Continuation-in-part of Ser. No. 691,585, Jan. 15, 1968, abandoned.

[52] U.S. Cl. ........................................195/100, 195/103.5 R
[51] Int. Cl. ............................................................C12k 1/00
[58] Field of Search................697/585; 424/180; 195/103.5, 195/100, 114, 28 R, 29

[56]  References Cited

UNITED STATES PATENTS

| | | | |
|---|---|---|---|
| 2,596,972 | 5/1952 | Allen | 195/100 X |
| 2,976,212 | 3/1961 | Friedrich et al | 424/180 X |
| 2,897,193 | 7/1959 | Novak | 424/180 X |

OTHER PUBLICATIONS

Stuart, " J. Clin. Path." 1:311– 314 (1948)
Chemical Abstracts 45:2084a; (1951)
Chemical Abstracts 50:4289e; (1956)
Chemical Abstracts 52:3983a; (1958)
Chemical Abstracts 60:13731a; (1964)
Chemical Abstracts 63:16952c; (1965)
Biological Abstracts 31:35238; (1957)

*Primary Examiner*—A. Louis Monacell
*Assistant Examiner*—Max D. Hensley
*Attorney*—Samuel L. Welt, Jon S. Saxe, Bernard S. Leon, Gerald S. Rosen and William M. Farley

[57]  ABSTRACT

Sulfated polysaccharide, polyethylene sulfonic acid, polyvinyl sulfuric acid, polystyreme sulfonic acid, a sulfate ester of a polyethylene ether of an aliphatic alcohol having from 12 to 18 carbon atoms, monothioglycerol or sulfated naphthalene are combined with a bacterial culture medium. These compositions inhibit the antibacterial components of contaminated body fluids, thereby allowing the contaminant bacteria to grow freely.

22 Claims, No Drawings

POLYANIONIC COMPOUNDS IN CULTURE MEDIA

RELATED APPLICATIONS

This application is a continuation-in-part of U.S. patent application Ser. No. 697,585, filed Jan. 15, 1968 now abandoned.

BACKGROUND OF THE INVENTION

The proper treatment of an illness requires, in the first instance, its correct diagnosis. For example, in diagnosing certain illnesses it becomes important to determine the presence of microorganisms in body fluids, for example, in blood, spinal fluid, thoracentesis fluid, synovial fluid, etc. This determination poses certain problems since it has long been recognized that mammalian blood and other body fluids possess natural bacteriostatic or antibacterial components. Accordingly, the presence of these components in human blood and other body fluids, and the effect thereof, must be taken into consideration when culturing these specimens. Furthermore, it is known that, upon coagulation, the bacteria in blood may become trapped in the interior of the clot and thus render them inaccessible to examination.

Body fluid cultures are prepared by adding a sample of the fluid to a vessel containing the culture medium. In culturing blood, for example, 5 ml. to 10 ml. of the blood sample is added to 50 ml. of culture media. As the culture medium, either trypticase soy broth (TSB) or thioglycollate broth is normally employed. In an effort to eliminate, or at least minimize the effect of, the natural antibacterial components of human blood and body fluids, it is common practice to dilute the specimen with very large volumes of culture medium. This practice, however, leaves much to be desired since the cultures may require many days to become positive. Furthermore, since coagulation hinders the determination of bacteria in human blood, anticoagulants are sometimes added to the culture medium to prevent coagulation and facilitate the isolation of microorganisms. Such a technique is not universally suitable, however, since certain anticoagulants have proved to be toxic to the microorganisms.

BRIEF SUMMARY OF THE INVENTION

The present invention provides a means for facilitating the determination of microorganisms in body fluids. The invention involves culturing microorganisms from a culture medium containing a polyanionic compound, or a mixture of compounds, selected from the group consisting of (1) a sulfated polysaccharide, (2) polyethylene sulfonic acid or a salt thereof, (3) polyvinyl sulfuric acid or a salt thereof, (4) polystyrene sulfonic acid or a salt thereof, (5) sulfate esters of polyoxyethylene ethers of aliphatic alcohols having from 12 to 18 carbon atoms, (6) monothioglycerol and (7) sulfonated napthalenes and salts, for example, alkali metal salts, thereof. Exemplary of the sulfated polysaccharides which are suitable for use in the practice of the invention are:
  a. a salt, for example, an alkali metal salt, of sulfated polygalacturonic acid methyl ester methyl glycoside,
  b. a salt, for example, an alkali metal salt, of sulfated polymannuronic acid,
  c. a salt, for example, an alkali metal salt, of sulfated polygalacturonic acid methyl glycoside,
  d. a salt, for example, an alkali metal salt, of sulfated cycloheptaamylose,
  e. a salt, for example, an alkali metal salt of sulfated cyclohexaamylose,
  f. a salt, for example, an alkali metal salt, of sulfated polyglucuronic acid methyl ester,
  g. a salt, for example, an alkali metal salt, of polymannuronic acid methyl glycoside,
  h. chitosan polysulfuric acid ester,
  i. dextran sulfate
  j. carrageenan (K-agar)
  k. a salt, for example, an alkali metal salt of polyanhydromannuronic acid sulfate.

Exemplary of the sulfate esters of polyoxyethylene ethers of $C_{12}$ and $C_{16}$ aliphatic alcohols which are suitable for use are sodium lauryl ether sulfate, sodium myristyl ether sulfate, etc. Included among the sulfonated naphthalenes which can be used are, for example, 5-hydroxyl-1-naphthalene sulfonic acid, 7-hydroxy,-1,3-naphthalene disulfonic acid disodium salt and 3-hydroxy-2,7-naphthalene disulfonic acid disodium salt. Additionally, the invention contemplates the use of one of more of the aforementioned polyanionic compounds, in combination with a salt, for example, an alkali metal salt, of polyanethol sulfonate, another known anticoagulant.

In carrying out this invention, the selected polyanionic compound, or mixture, is introduced into a culture medium. The polyanionic compound or compounds can be added to the culture medium prior or subsequent to the introduction of the body fluid into the medium. In the culture medium, the polyanionic compound serves several functions. First of all, it eliminates, or at least minimizes, the natural bacteriostatic components present in the body fluid. Secondly, by preventing coagulation, it renders the microorganisms accessible to isolation. Thirdly, it inhibits certain antibiotics, such as, polymyxin sulfate and streptomycin sulfate, so that specimens from patients receiving these antibiotics can be cultured readily.

The invention, accordingly, provides an extremely important diagnostic tool. Since the invention facilitates the culturing of microorganisms from body fluids, an attending physician may be advised more rapidly whether microorganisms are present in the fluid of his patient and, with such information in hand, he will be able to prescribe more quickly the correct antibiotic therapy.

DETAILED DESCRIPTION

In its broadest embodiment, the invention provides a means for effecting improvements in culturing microorganisms from body fluids.

In a more limited embodiment, the invention provides a means for eliminating, or at least minimizing, the antibacterial components which are normally present in blood or other body fluids so that such components will not interfere with, or delay, the determination of microorganisms in these fluids.

In a specific embodiment, the invention provides a body fluid culture medium, for example, a blood culture medium, which contains a component which has anticoagulant activity and the ability to eliminate the natural antibacterial components of such body fluid.

As the compound which has anticoagulant activity and the ability to eliminate the natural antibacterial components of body fluids, there can be used, one or a mixture of two or more, of the following polyanionic compounds:
  1. a sulfated polysaccharide, such as,
     a. a salt, for example, an alkali metal salt, of sulfated polygalacturonic acid methyl ester methyl glycoside, such as, the sodium or potassium salt,
     b. a salt, for example, an alkali metal salt, of sulfated polymannuronic acid, such as, the sodium or potassium salt,
     c. a salt, for example, an alkali metal salt, of sulfated polygalacturonic acid methyl glycoside, such as, the sodium or potassium salt,
     d. a salt, for example, an alkali metal salt, of sulfated cycloheptaamylose, such as, the sodium or potassium salt,
     e. a salt, for example, an alkali metal salt, of sulfated cyclohexaamylose, such as, the sodium or potassium salt,
     f. a salt, for example, an alkali metal salt, of sulfated polyglucuronic acid methyl ester, such as, the sodium or potassium salt,
     g. a salt, for example, an alkali metal salt, of sulfated polymannuronic acid methyl glycoside, such as, the sodium or potassium salt,
     h. chitosam polysulfuric acid ester,
     i. dextran sulfate,
     j. carrageenan (K-agar), k. a salt, for example, an alkali metal salt, of polyanhydromannuronic acid sulfate, such as, the sodium or potassium salt, 2. polyethylene sulfonic acid, or a salt, for example, an alkali metal salt, thereof, such as, the sodium salt or potassium salt, 3. polystyrene sulfonic acid, for a salt, for example, an alkali metal salt, thereof, such as, the sodium salt or potassium salt, 4. polystyrene sulfonic acid, for example, an alkali metal salt, thereof, such as, the sodium salt or potassium salt, 5. a salt, for example, an alkali metal salt of an sulfate ester of a polyoxyethylene ether of an aliphatic alcohol having a carbon chain length of from about 12 to about 18 carbon atoms, such as, sodium lauryl ether sulfate, sodium myristyl ether sulfate, 6. monothioglycerol, and 7. a sulfonated naphthalene, or a salt, for example, an alkali metal salt, thereof, such as, 5-hydroxy-1-naphthalene sulfonic acid, 7-hydroxy-1,3-naphthalene disulfonic acid disodium salt, 3-hydroxy-2,7-naphthalene disulfonic acid disodium salt.

Additionally, one or more of the aforementioned polyanionic compounds can be used in admixture with a salt of polyanethol sulfonate. In general, any water-soluble salt of the polyanethol sulfonate can be used. Under ordinary circumstances, however, an alkali metal salt, for example, the sodium salt, will be employed.

A majority of the polyanionic compounds which are employed in the practice of this invention are known compounds. For example, among the sulfated polysaccharides, dextran sulfate, carrageenan and the sodium salt of polyanhydromannuronic acid sulfate are presently commercially available; salts of the sulfated polygalacturonic acid methyl glycoside and a process for their production, and salts of the sulfated polygalacturonic acid methyl ester methyl glycoside, and a process for their production, are described in U.S. Pat. No. 2,599,564; salts of sulfated polymannuronic acid methyl glycoside, and a process for their production, are described in U.S. Pat. No. 2,694,058; salts of sulfated cyclohexaamylose and salts of sulfated cycloheptaamylose, and processes for their production, are described in U.S. Pat. No. 2,923,704; salts of polyanethol sulfonate, and a process for their production, are described in U.S. Pat. No. 1,907,371; and salts of chitosan polysulfuric acid esters are produced as described in U.S. Pat. No. 2,831,851, particularly Example 1 thereof. For completeness of disclosure, a description of a method for producing salts of sulfated polymannuronic acid and for producing salts of sulfated polyglucuronic acid methyl ester will be set forth hereinafter. The remainder of the polyanionic compounds, disclosed herein as suitable for use, are commercially available.

In carrying out the invention, the polyanionic compound can be added directly to the body fluid specimen prior to the addition of the specimen to the culture medium. In the alternative, the polyanionic compound can be incorporated into the culture medium prior to the introduction therein of the specimen. In general, any standard culture medium can be used in the practice of this invention. In the preferred embodiment of the invention, however, either trypticase soy broth or thioglycollate broth is employed as the culture medium. The quantity of polyanionic compound used in any particular instance is variable within certain prescribed limits. In the preferred practice of the invention, however, the quantity of the polyanionic compound or compounds used will be equivalent to form about 0.05 percent to about 2.0 percent of the weight of the culture medium. Where a salt of polyanethol sulfonate is used in admixture with one or more of the polyanionic compounds heretofore named, such salt should be used in a quantity not exceeding about 0.5 percent of the weight of the culture medium.

The manner in which the polyanionic compound is introduced into the body fluid specimen, or into the culture medium, is not particularly critical. Under ordinary circumstances, however, the polyanionic component or components will be incorporated into the system as such or in the form of a sterile aqueous solution containing from about 0.25 percent to about 20 percent by weight of the polyanionic component or components.

In general, the practice of the present invention does not necessitate any change in the conventional manipulative steps involved in culturing blood and other body fluids. It merely requires an additional step, namely, the introduction of the polyanionic compound into the system. The point in time at which this is done is not particularly critical. Thus, for example, the polyanionic compound can be introduced into the system during the production of the culture medium. The product, which is thus obtained, is then ready for subsequent use, merely by the addition of the body fluid from which the microorganisms are to be cultured. In the alternative, the polyanionic compound or compounds can be added to the body fluid specimen prior to the introduction of the specimen into the culture medium-containing vessel. In another alternative embodiment, the polyanionic compound or compounds can be added to the culture medium prior to the introduction of the body fluid specimen therein.

The procedure hereinafter described is illustrative, but not limitative, of the manner in which a body fluid is cultured in the practice of this invention. In such method, a polyanionic compound-containing broth is first produced. This is accomplished for example, by mixing a ratio of from about 0.5 to about 20 grams of the polyanionic compound or compounds with 1,000 ml. of the culture medium, e.g., trypticase soy broth, thioglycollate broth, etc. The mixture, thus obtained, is then sterilized by autoclaving, e.g., at 15 pounds pressure for a period of about 15 minutes. Thereafter, from about 5 ml. to about 10 ml. of the body fluid is added to from about 15 ml. to about 40 ml. of the broth. After incubating the mixture, for example, at a temperature of about 37° C., the viability can be assayed quantitatively by plating 0.1 ml. aliquots at timed intervals. Alternatively, the presence of bacteria can be detected qualitatively by the appearance of visible turbidity in the medium.

The present invention facilitates the accurate determination of microorganisms in body fluids, for example, in human blood or the blood of other animals, spinal fluid, thoracentesis fluid; synovial fluid; etc. By preventing the coagulation of the specimen, the determination can be made in a period of time which is relatively short as compared to very many prior art methods. Furthermore, by eliminating the antibacterial components which deleteriously affect the determination, a means is furnished for obtaining results which are accurate and completely reliable. By culturing microorganisms from the culture medium disclosed herein, the diagnosis of certain infectious processes, such as, bacteremia and septicemia, are facilitated and their proper treatment expedited.

For a fuller understanding of the nature and objects of this invention, reference may be had to the following examples which are given merely as further illustrations of the invention and are not to be construed in a limiting sense.

EXAMPLE 1

In this example, two test tubes, each containing 3 ml. of sterile trypticase soy broth were first prepared. To one of the test tubes, there was added 1 ml. of a saline solution containing 5 percent by weight of the sodium salt of sulfated polygalacturonic acid methyl ester methyl glycoside. To the other test tube, 1 ml. of saline was added. Thereafter, approximately 200 cells of *Escherichia coli* type 0126 and 1 ml. of fresh human blood were added to each of the two test tubes. Thereafter, both test tubes were incubated at a temperature of 37° C. for a period of four hours.

At the end of that period of time, the number of viable organisms in the test tube was determined. The tube containing the glycoside salt yielded approximately 30,000 bacteria/ml. while no viable organisms could be isolated from the tube which did not contain the glycoside salt.

The foregoing results dramatically demonstrate the effectiveness of the sodium salt of sulfated polygalacturonic acid methyl ester methyl glycoside as a component of blood culture media.

EXAMPLE 2

Seven test tubes each containing 5 ml. of sterile trypticase soy broth were first prepared. Approximately 200 cells of *Streptococcus mitis* were added to each test tube. Thereafter, 1.0 ml. of a saline solution containing the polyanionic compound and the quantity thereof, thereinafter indicated, was then added to each test tube, except one, as follows:

Test Tube No. 1—2.1 percent sodium salt of sulfated polymannuronic acid methyl glycoside
Test Tube No 2—2.1 percent sodium salt of sulfated polymannuronic acid
Test Tube No. 3—7.0 percent sodium salt of sulfated polygalacturonic acid methyl glycoside
Test Tube No. 4—3.5 percent sodium salt of sulfated cycloheptaamylose
Test Tube No. 5—7.0 percent sodium salt of sulfated cyclohexaamylose
Test Tube No. 6—7.0 percent sodium salt of sulfated polygalacturonic acid methyl ester methyl glycoside To test tube No. 7 there was added 1.0 ml. of saline. Finally, to each tube there was added 1 ml. of fresh human blood.

All of the test tubes were incubated at a temperature of 37° C. for a period of 24 hours. At the end of 4 hours, 7 hours and 24 hours incubation, the number of viable organisms in the various test tubes was determined. The results are set forth in the table which follows:

| Test Tube No. | Viable Count per Ml. | | |
|---|---|---|---|
| | Four Hours | Seven Hours | Twenty-Four Hours |
| 1 | $4 \times 10^2$ | $3 \times 10^4$ | $2 \times 10^9$ |
| 2 | $5 \times 10^2$ | $3 \times 10^4$ | $2 \times 10^9$ |
| 3 | $7 \times 10^2$ | $8 \times 10^4$ | $2 \times 10^9$ |
| 4 | $4 \times 10^2$ | $3 \times 10^4$ | $1 \times 10^8$ |
| 5 | $3 \times 10^2$ | $2 \times 10^4$ | $1 \times 10^9$ |
| 6 | $8 \times 10^2$ | $5 \times 10^4$ | $1 \times 10^9$ |
| 7 | $< 10^1$ | $1 \times 10^2$ | $1 \times 10^8$ |

The foregoing results demonstrate that the polyanionic compounds, added to the culture medium in Test Tubes Nos. 1 to 6, inclusive, eliminated the growth retarding action of the blood (demonstrated in tube No. 7) especially during the early (4–7 hour) incubation period.

EXAMPLE 3

Seven test tubes, each containing 5.0 ml. of trypticase soy broth were first prepared. Thereafter, a polyanionic compound or combination thereof was added to six of the test tubes as follows:

Test Tube No. 1    1.0 ml. of saline solution containing 2.1% of sodium polyanethol sulfonate and 7.0% of sodium salt of sulfated polygalacturonic acid methyl ester methyl glycoside Test Tube No. 2    1.0 ml. of saline solution containing 0.7% of sodium polyanethol sulfonate and 7.0% of sodium salt of sulfated polygalacturonic acid methyl ester methyl glycoside Test Tube No. 3    1.0 ml. of saline solution containing 0.35% of sodium polyanethol sulfonate and 7.0% of sodium salt of sulfated polygalacturonic acid methyl ester methyl glycoside Test Tube No 4    1.0 ml. of saline solution containing 0.07% of sodium polyanethol sulfonate and 7.0% of sodium salt of sulfated polygalacturonic acid methyl ester methyl glycoside Test Tube No. 5    1.0 ml. of saline solution solution containing 0.35% of sodium polyanethol sulfonate Test Tube No. 6    1.0 ml. of saline solution containing 7.0% of sodium salt of sulfated polygalacturnic acid methyl ester methyl glycoside To the seventh test tube, 1.0 ml. of saline was added. Thereafter, 0.1 ml. of a saline suspension containing approximately 200 cells of *Staphylococcus albus* was added to each test tube. To each tube was then added 1 ml. fresh human blood. The test tubes were incubated at a temperature of 37° C. for a period of 24 hours. At the end of 4 hours, 7 hours and 24 hours, the number of viable organisms in each test tube was determined. The results of the determinations are set forth in the table which follows:

| Test Tube No. | Viable Count Per Ml. | | |
|---|---|---|---|
| | Four Hours | Seven Hours | Twenty-Four Hours |
| 1 | $2 \times 10^1$ | $2 \times 10^3$ | $9 \times 10^7$ |
| 2 | $8 \times 10^1$ | $4 \times 10^3$ | $3 \times 10^8$ |
| 3 | $5 \times 10^1$ | $4 \times 10^3$ | $4 \times 10^8$ |
| 4 | $8 \times 10^1$ | $4 \times 10^3$ | $2 \times 10^8$ |
| 5 | $1 \times 10^2$ | $2 \times 10^3$ | $6 \times 10^6$ |
| 6 | $4 \times 10^2$ | $5 \times 10^3$ | $4 \times 10^7$ |
| 7 | 0 | 0 | $4 \times 10^3$ |

The results set forth in the foregoing table demonstrate that the combination of a polyanionic compound with the sodium salt of polyanethol sulfonate is effective in eliminating the antibacterial components of the human blood and also is superior to either anticoagulant used alone.

EXAMPLE 4

In this example, two test tubes, each containing 3 ml. of sterile trypticase soy broth, were first prepared. Thereafter, 1 ml. of a saline solution containing 0.25 percent by weight of the potassium salt of polyvinly sulfuric acid was added to one of the test tubes. To the other test tube, there was added 1.0 ml. of saline solution. After thorough mixing, 0.1 ml. of a saline suspension containing approximately 150 cells of *Escherichia coli* J and 1 ml. of fresh human blood were added to each of the test tubes and the tubes were incubated at a temperature of 37° C.

At the end of 7 hours and 24 hours incubation, the number of viable organisms in the two test tubes was determined. The results are set forth in the table which follows:

| Test Tube No. | Number of Bacteria Per Ml | |
|---|---|---|
| | Seven Hours | Twenty-Four Hours |
| 1 | $2 \times 10^6$ | $2 \times 10^9$ |
| 2 (control) | $< 10^2$ | $< 10^2$ |

EXAMPLE 5

In this example, three test tubes, each containing 3.0 ml. of sterile trypticase soy broth, were prepared. To test tube No. 1 there was added 1.0 ml. of a saline solution containing 2.5 percent by weight of 5-hydroxy-1-naphthalene sulfonic acid. To test tube No. 2, there was added 1 ml. of a saline solution containing 2.5 percent by weight of monothioglycerol. To test tube No. 3, 1.0 ml. a saline solution was added. To each of the

7 three test tubes, 0.1 ml. of a saline solution containing approximately 150 cells of *Escherichia coli J* and 1.0 ml. of fresh human blood were added. The three test tubes were then incubated at a temperature of 37° C. for a period of 24 hours.

At the end of 7 hours and 24 hours, the number of viable organisms in the test tubes was determined. The results are set forth in the table which follows:

| Test Tube | Number of Bacteria Per Ml | |
| No. | Seven Hours | Twenty-Four Hours |
| --- | --- | --- |
| 1 | $6 \times 10^4$ | $2 \times 10^9$ |
| 2 | $5 \times 10^5$ | $2 \times 10^9$ |
| 3 (control) | $<10^2$ | $5 \times 10^6$ |

EXAMPLE 6

In this example, five test tubes, each containing 3 ml. of sterile trypticase soy broth were first prepared. Thereafter, 1.0 ml. of a saline solution containing the compounds identified hereinafter, in the quantities hereinafter designated, was added to the test tube as follows:

Test Tube No. 1—0.5 percent dextran sulfate (molecular weight 500,000)
  Test Tube No. 2—0.5 percent dextran sulfate (molecular weight 2,000,000)
  Test Tube No. 3—0.5 percent Carrageenan
  Test Tube No. 4—2.5 percent of the sodium salt of polyethylene sulfonic acid To test tube No. 5, the control experiment, there was added 1.0 ml. of saline. Subsequently, 0.1 ml. of a saline suspension containing approximately 150 cells of *Escherichia coli* and 1.0 ml. of fresh human blood were added to each of the five test tubes which were then incubated at a temperature of about 37° C. for a period of 24 hours. At the end of 7 hours and 24 hours of incubation, the test tubes were assayed for the number of incubation, the test tubes were assayed for the number of viable organisms per ml. The results of these assays are set forth in the table which follows:

| Test Tube | Number of Bacteria Per Ml | |
| No. | Seven Hours | Twenty-Four Hours |
| --- | --- | --- |
| 1 | $6 \times 10^3$ | $1 \times 10^9$ |
| 2 | $6 \times 10^3$ | $1 \times 10^9$ |
| 3 | $2 \times 10^5$ | $1 \times 10^9$ |
| 4 | $1 \times 10^5$ | $1 \times 10^9$ |
| 5 | $<10^1$ | $<10^1$ |

EXAMPLE 7

In this example, two test tubes, each containing 3 ml. of sterile trypticase soy broth were first prepared. To one test tube was added 1 ml. of a saline solution containing 0.25 percent by weight of the sodium salt of polystyrene sulfonate. To the other tube was added 1 ml. of saline. After thorough mixing, 0.1 ml. of a saline suspension containing approximately 150 cells of *Escherichia coli J* and 1 ml. of fresh human blood were added to each of the test tubes and the tubes were then incubated at 37° C. for a period of 24 hours. At the end of 7 and 24 hours incubation, the number of viable organisms in the two test tubes was determined and the following results were obtained:

| Test Tube | Number of Bacteria Per Ml | |
| No. | Seven Hours | Twenty-Four Hours |
| --- | --- | --- |
| 1 | $7 \times 10^5$ | $2 \times 10^9$ |
| 2 (control) | $3 \times 10^3$ | $<10^3$ |

8

EXAMPLE 8

In this example, three test tubes, each containing 3 ml. of sterile trypticase soy broth were first prepared. To one test tube was added 1 ml. of a saline solution containing 2.5 percent of volume of a 26 percent by weight solution of sodium lauryl ether sulfate. To the second tube was added 1 ml. of a saline solution containing 2.5 percent by volume of a 60 percent by weight solution of sodium myristyl ether sulfate. Finally to the third tube was added 1 ml. of saline. After thorough mixing, 0.1 ml. of a saline suspension containing approximately 130 cells of *Escherichia coli J* and 1 ml. of fresh human blood were added to each of the test tubes and the tubes were then incubated at 37° C. for a period of 24 hours. At the end of 7 and 24 hours incubation, the number of viable organisms in the three test tubes was determined and the following results were obtained:

| Test Tube | Number of Bacteria Per Ml | |
| No. | Seven Hours | Twenty-Four Hours |
| --- | --- | --- |
| 1 | $7 \times 10^4$ | $1 \times 10^9$ |
| 2 | $2 \times 10^5$ | $1 \times 10^9$ |
| 3 (control) | $1 \times 10^3$ | $4 \times 10^6$ |

EXAMPLE 9

In this example, two test tubes, each containing 3 ml. of sterile trypticase soy broth were first prepared. To one test tube was added 1 ml. of a saline solution containing 2.5 percent by weight of the sodium salt of polyanhydromannuronic acid sulfate. To the other tube was added 1 ml. of saline. After thorough mixing, 0.1 ml. of a saline suspension containing approximately 125 cells of *Escherichia coli J* and 1 ml. of fresh human blood were added to each tube and the tubes were then incubated at 37° C. for a period of 24 hours. At the end of 7 and 24 hours of incubation, the number of viable organisms in the two test tubes was determined and the following results were obtained:

| Test Tube | Number of Bacteria Per Ml | |
| No. | Seven Hours | Twenty-Four Hours |
| --- | --- | --- |
| 1 | $2 \times 10^5$ | $2 \times 10^9$ |
| 2 (control) | $<10^1$ | $<10^1$ |

For the sake of completeness, the preparation of the sodium salt of sulfated polyglucuronic acid methyl ester and the preparation of the sodium salt of sulfated polymannuronic acid used in Example 2, is set forth hereinafter. It should be understood, however, that neither the compounds themselves, nor the processes for their preparation are part of the present invention.

PREPARATION OF THE SODIUM SALT OF SULFATED POLYMANNURONIC ACID a. Preparation of Alginic Acid 50 grams of commercial sodium alginate was suspended in one liter of ward water in a Waring blender and stirred to form a clear thick gel. Thereafter, 1.0 N hydrochloric acid was added to the gel with stirring, until acid to Congo red (pH about 3.5). The precipitate was allowed to settle and the supernatant liquor was siphoned off. The precipitate was washed with three 500 cc. portions of ethanol while in the blender—with stirring and siphoning as previously. Finally, the amorphous powder is collected on a sintered glass funnel, washed with ethanol, and dried in high vacuo over anhydrous calcium chloride. By the described procedure, alginic acid was obtained as a dry free-flowing powder.

b. Sulfation of Alginic Acid

A mixture of chlorosulfonic acid and pyridine was prepared at a temperature of 0° to 5° C. by the careful addition of 140 cc. of chlorosulfonic acid to 700 cc. of dry pyridine. 20 grams of powdered alginic acid was then added while keeping the temperature between 0° and 10° C. After the addition, the mixture was stirred for 1 hour at room temperature, following which it was heated with constant stirring at 70° to 75° C. for 6 hours. The reaction mixture was then allowed to stand at room temperature overnight. The crude pyridine salt of the sulfated alginic acid was isolated by heating the reaction mixture to 70° C. and adding the warm mixture in a fine stream to 3 liters of methanol with constant stirring. The precipitate was washed with one liter portions of methanol by trituration and the washed precipitate was collected by centrifugation. There was thus obtained, the crude pyridine salt of sulfated alginic acid.

The pyridine salt was purified by dissolving it in 150 cc. of water and the solution was clarified by filtration through an asbestos pad. The purified pyridine salt was isolated by the addition of the filtrate to 1,500 cc. of methanol with constant stirring.

The purified pyridine salt, produced as described in the preceding paragraph, was converted to the sodium salt by dissolving it in 100 cc. of water, cooling the solution to 5° C. and adding 6 N sodium hydroxide, while maintaining the temperature at about 5° C., until the pH of the solution was about 9.5. The alkaline solution was then added rapidly to 10 volumes of methanol with constant stirring to precipitate the sodium salt. The salt obtained was purified further by dissolving it in water and precipitating it with methanol as previously described. The sodium salt of the sulfuric acid ester of polymannuronic acid (alginic acid) was obtained as a light yellow free-flowing powder when dried in high vacuo over anhydrous $CaCl_2$.

PREPARATION OF SODIUM SALT OF SULFATED POLYGLUCURONIC ACID METHYL ESTER a. 50 grams of commercial oxidized cellulose (10–12 percent carboxyl) is suspended in 500 cc. of 5 percent HCl in methanol and the mixture stirred under reflux for 96 hours. The mixture was then cooled and the precipitate was collected by centrifugation and washed with several volumes of methanol and finally dried over anhydrous calcium chloride in vacuo. There was obtained a degraded oxidized cellulose ester.

b. To a mixture of 74 cc. of chlorosulfonic acid and 430 cc. of dry pyridine prepared at 0° to 5° C. was added, with constant stirring, 20 grams of the degraded oxidized cellulose ester produced as described in the preceding paragraph. The mixture was heated with stirring at 80° to 85° C. for 6 hours. The reaction mixture was allowed to stand at room temperature for 17 hours. The crude pyridine salt of the sulfated product was isolated from the reaction mixture by adding the warmed reaction mixture (60° to 70° C.) to 1.5 liters of methanol with stirring. The crude pyridine salt that separates was collected by centrifugation and washed by trituration and decantation with several volumes of methanol. To further purify the pyridine salt it was dissolved in 100 cc. of water and clarified by filtration through an asbestos pad and the purified pyridine salt recovered by precipitation with methanol as previously described.

The pyridine salt was collected by centrifugation and washed with several volumes of methanol and finally dried over calcium chloride in vacuo. The pyridine salt was converted to the sodium salt by dissolving it in 100 cc. of water and adding 6N NaOH until the pH was 9.5, the temperature being maintained between 5° to 10° C. during the addition of the alkali. The alkaline solution was then added to 10 volumes of methanol to precipitate the sodium salt. The salt was collected by centrifugation and washed with several volumes of methanol and further purified by dissolving it in 100 cc. of water, filtering it through an asbestos pad, and reprecipitating the purified sodium salt with 10 volumes of methanol. The salt is collected, as previously described, by centrifugation, washed with methanol and finally dried in vacuo over anhydrous calcium chloride.

The product, thus obtained, was the sodium salt of sulfated polyglucuronic acid methyl ester having a viscosity of 0.185 cps.

We claim:

1. A composition for culturing microorganisms from body fluids containing antibacterial components which comprises (a) a culture medium and, based on the weight of said aqueous medium, from about 0.05 percent to about 2.0 percent of (b) a compound selected from the group consisting of (1) a sulfated polysaccharide, (2) polyethylene sulfonic acid or a salt thereof (3) polyvinyl sulfuric acid or a salt thereof, (4) polystyrene sulfonic acid or a salt thereof, (5) a sulfate ester of a polyoxyethylene ether of an aliphatic alcohol having from 12 to 18 carbon atoms, (6) monothioglycerol and (7) a sulfonated napthalene.

2. The composition of claim 1 wherein there is present also a salt of polyanethol sulfonate in an amount not exceeding about 0.5 percent of the weight of the said culture medium.

3. The composition of claim 1 wherein ingredient (b) is a sulfated polysaccharide.

4. The composition of claim 1 wherein ingredient (b) is polyethylene sulfonic acid or a salt thereof.

5. The composition of claim 1 wherein ingredient (b) is polyvinyl sulfuric acid or a salt thereof.

6. The composition of claim 1 wherein ingredient (b) is polystyrene sulfonic acid or a salt thereof.

7. A composition for culturing microorganisms from body fluids containing antibacterial components which comprises (a) a culture medium and, based on the weight of said aqueous medium, from about 0.05 percent to about 2.0 percent of (b) a sulfate ester of a polyoxyethylene ether of an aliphatic alcohol having from 12 to 18 carbon atoms.

8. The composition of claim 1 wherein ingredient (b) is monothioglycerol.

9. The composition of claim 1 wherein ingredient (b) is a sulfonated napthalene.

10. The composition of claim 3 wherein the sulfated polysaccharide is a salt of sulfated polygalacturonic acid methyl ester methyl glycoside.

11. The composition of claim 3 wherein the sulfated polysaccharide is a salt of sulfated polymannuronic acid.

12. The composition of claim 3 wherein the sulfated polysaccharide is a salt of sulfated polygalacturonic acid methyl glycoside.

13. The composition of claim 3 wherein the sulfated polysaccharide is a salt of sulfated cycloheptaamylose.

14. The composition of claim 3 wherein the sulfated polysaccharide is a salt of sulfated cyclohexaamylose.

15. The composition of claim 3 wherein the sulfated polysaccharide is a salt of sulfated polyglucuronic acid methyl ester.

16. The composition of claim 3 wherein the sulfated polysaccharide is a salt of sulfated polymannuronic acid methyl glycoside.

17. The composition of claim 3 wherein chitosan polysulfuric acid ester is present.

18. The composition of claim 3 wherein dextran sulfate is present.

19. The composition of claim 3 wherein carrageenan is present.

20. The composition of claim 3 wherein a salt of polyanhydromannuronic acid sulfate is present.

21. A method for producing a medium for culturing microorganisms from body fluids containing antibacterial components which comprises adding to a culture medium from about 0.05 percent to about 2.0 percent by weight, based on the weight of said culture aqueous medium, of a compound selected from the group consisting of (1) a sulfated polysaccharide, (2) polyethylene sulfonic acid or a salt thereof, (3) polyvinyl sulfuric acid or a salt thereof, (4) polystyrene sulfonic acid or a salt thereof, (5) a sulfate ester of a polyoxyethylene ether of an aliphatic alcohol having from 12 to 18 carbon atoms, (6) monothioglycerol and (7) a sulfonated napthalene.

22. A method for detecting certain infectious processes such as bacteremia and septicemia which comprises adding a body fluid containing antibacterial components to a culture medium which contains, based on the weight of said culture aqueous medium, from about 0.005 percent to about 2.0 percent by weight of a compound selected from the group consisting of (1) a sulfated polysaccharide, (2) polyethylene sulfonic acid or a salt thereof, (3) polyvinyl sulfuric acid or a salt thereof, (4) polystyrene sulfonic acid or a salt thereof, (5) a sulfate ester of a polyoxyethylene ether of an aliphatic alcohol having from 12 to 18 carbon atoms, (6) monothioglycerol and (7) a sulfonated naphthalene.

* * * * *

PO-1050
(5/69)

UNITED STATES PATENT OFFICE
CERTIFICATE OF CORRECTION

Patent No. 3,671,399          Dated June 20, 1972

Inventor(s) Cekoric et al.

It is certified that error appears in the above-identified patent and that said Letters Patent are hereby corrected as shown below:

Under Related U.S. Application Data "Continuation-in-part of Ser. No. 691,585," should be Continuation-in-part of Ser. No. 697,585

Signed and sealed this 13th day of March 1973.

(SEAL)
Attest:

EDWARD M. FLETCHER, JR.　　　　　　　　　ROBERT GOTTSCHALK
Attesting Officer　　　　　　　　　　　　Commissioner of Patents